3,435,024
PROCESS FOR THE PREPARATION OF SURFACTANTS FROM HYDROXYLATED ORGANIC COMPOUNDS, FATTY ACID ESTERS AND ALKYLENE OXIDES
Luciano Nobile, Emanuele Condorelli, Tullio La Noce, and Anteo Poma, Milan, Italy, assignors to Ledoga S.p.A., Milan, Italy
No Drawing. Filed June 14, 1965, Ser. No. 463,921
Claims priority, application Italy, Mar. 18, 1965, 6,130/65
Int. Cl. C11d 1/74; C11c 3/04; C07c 69/32
U.S. Cl. 260—210
25 Claims

ABSTRACT OF THE DISCLOSURE

This invention provides surfactant products obtained by simultaneously reacting 10 to 50 parts by weight of at least one hydroxylated organic substance selected from the group consisting of mono-hydric alcohols, glycols, tri-hydric alcohols, tetra-hydric alcohols, pentitols, hexitols, disaccharides, trisaccharides having from 1 to 18 carbon atoms, 50 to 90 parts by weight of at least one fatty acid ester selected from the group consisting of methyl- and glycerin-esters of fatty acids having from 10 to 20 carbon atoms, and 100 to 300 parts by weight of at least one alkylene oxide having from 2 to 4 carbon atoms, in the presence of an alkaline catalyst at a temperature of between 70° and 200° C. and at a pressure of between 1 and 50 atmospheres.

---

This invention relates to a new process for obtaining, in a single operation, esterified and oxyalkylated derivatives of hydroxylated organic compounds, said derivatives having optimum surfactant properties.

It is known that the esters of poly-hydric alcohols with long-chain fatty acids used as surfactants are prepared by reaction of the hydroxylated compound with a halide or with an anhydride of the fatty acid and, according to the most recent trends, by alcoholysis of a fatty acid ester with the chosen alcohol.

In particular, sucrose esters have been prepared by reaction of sucrose with methyl esters of fatty acids or with oils and fats, i.e. with natural or synthetic triglycerides. In this case the formed active substance—in the specific case the fatty acid esters of sucrose—is separated from the non-reacted triglycerides and sucrose, as well from the formed mono- and di-glycerides and glycerol.

The alcoholysis reactions for the preparation of surfactants, in particular the alcoholysis reaction between disaccharides and fats, are made to take place according to the known processes in the presence of alkaline catalysts and of a solvent. The presence of a solvent is necessary otherwise sucrose and fats which are solid substances, mutually insoluble, will not react together, also if heated at the reaction temperature in the presence of strong alkalies as catalysts, whereas the disaccharide will alter due to pyroylsis phenomena.

It is also known that, if the fatty acid esters of poly-alcohols of the type indicated above (e.g. sucrose esters with fatty acid) are made to react with ethylene oxide, there is etherification of the free hydroxyls with the formation of polyoxyethylene chains. Thus, surfactant products are obtained with technological properties and characteristics of use which are superior to those of the initial esters.

Further it is known:

That hydroxylated organic compounds and, in particular, polyalcohols, are generally insoluble in alkylene oxides;

That it is very difficult to get thermolabile poly-hydroxylated organic compounds to react with alkylene oxides, especially if operating in the absence of a solvent, unless a specific catalyst is used, such as trimethylamine, which is costly, inflammable, toxic, has a high vapor pressure and a low boiling point, and therefore involves technological difficulties and risks. If, on the other hand, it is desired to operate in the presence of solvents, it is practically impossible to find one which does not react with the alkylene oxide and which is capable of dissolving the high melting-point and thermolabile polyhydroxylated compounds, the alkylene oxides and the usual strong alkaline catalyst;

That triglycerides are nearly insoluble in polyalcohols.

We have found that triglycerides, even in the presence of specific and conventional oxyethylation catalyst, do not react with ethylene oxide at temperature around 120–200° C., and at any rate in the operative conditions of this invention.

We have now discovered, and it forms the aim of this invention a new process which makes it possible to prepare surfactant substances with variable properties, in a very wide range, from humectants, wetting agents, emulsifying agents to detergents, etc., starting from aliphatic or cyclo-aliphatic organic substances, mono- or poly-hydroxylated; from esters of fatty acid with 6–30 carbon atoms and from alkylene oxides. The new process which is the object of this invention is characterized by the fact that components selected in all the three above indicated classes are made to react simultaneously in one or more steps arriving at a homogeneous phase, preferably in the absence of solvent and in the presence of small quantities of an alkaline substance as a catalyst, obtaining with a practically quantitative yield mixtures of products having on the whole and to various degrees surfactant properties and ready to be used as such or after decolorization, if necessary. See table on page 9.

The possibility of carrying out the process which is the object of this invention with any hydroxylated substance as defined above, fatty acid ester and alkylene oxide, is quite surprising. In fact, as mentioned above, poly-hydric alcohols such as disaccharides, fatty acid esters such as triglycerides and alkylene oxides such as ethylene oxide, since they are not mutually soluble, did not make it possible to foresee a reciprocal and simultaneous reactivity. Furthermore, the fact was in no way foreseeable, and it is still not possible to explain and interpret it from a theoretical point of view, that is, that by making reagents chosen in all the three classes of compounds indicated above, to react simultaneously and directly (according to particular modalities hereafter described), it would be possible to initiate the reaction at temperatures much lower than those at which the decomposition of high melting and thermolabile poly-hydric alcohols is started and that a homogeneous phase would be formed.

In actual fact, in spite of the well known importance as surfactants of poly-oxyalkylated ester derivatives of sucrose or of some alcoholic compounds (obtained utilizing as starting material alkylene oxides, oils and/or fats and alcoholic compounds), no one had ever demonstrated or even suggested:

That it would be possible to get substances chosen among all the three above-mentioned classes to react simultaneously in the sense of determining simultaneous polyoxy-alkylation and acylation processes;

That the reactions could take place, using high melting and thermolabile polyalcohols, at temperatures even lower than those at which oxyethylation normally starts up and, in particular, at temperatures very far from those at which the said high melting and thermolabile poly-alcohols begin to decompose;

That the reactions could take place even in the absence of solvents;

That the reactions could take place even and above all using only one catalyst;

That the reactions could take place on only 2–4 hours;

That the reactions could take place with a whole series of hydroxylated organic substances not previously considered, obtaining also in this case surfactant products;

That in particular, the reactions could give rise to homogeneous surfactant mixtures.

The technical progress contributed by the process of the invention appears evident if we consider that the surfactant products obtainable starting from oils or fats, alkylene oxides and sucrose were in substance, up to now, the oxyalkylated mono-and di-esters of source with fatty acids, and that said products were obtained by means of the following separate and distinct steps;

Alcoholysis of the sucrose with an oil or a fat in determinate conditions of solvent, catalyst, temperature and time; in particular, the time is generally in the range of 12 to 15 hours and the temperature is generally 140–160° C.;

Distillation of the solvent, separation of the mono- and di-esters of the sucrose from the inert substances, such as the non-reacted sucrose and the fatty oil, glycerol, etc.;

Oxyalkylation of the mixture of sucrose mono-and di-esters in conditions of solvent, time and temperature, generally different from those of alcoholysis. In particular, the time required is approximately 2–3 hours and the temperature is 110–190° C.;

Distillation of the solvent from the mixture of oxyalkylated sucrose mono- and di-esters.

Finally, with the known processes, four or more distinct operations, an overall period of 15–20 hours, temperatures above 140° C., use of various types of catalysts and solvents, two solvent recovery cycles, were required, producing a yield in surfactant products, calculated on the starting sucrose, of a maximum of 50%.

With the new invention process, starting, for example, from the same substances, namely, from oils or fats, alkylene oxides and sucrose, only one operation is necessary, the overall time is 2–4 hours, temperature may be kept even lower than 135° C., only one type of catalyst is used, no solvent is required, and a yield is obtained in weight of surfactant mixtures practically equal to 100% of the weight of the substances allowed to react.

It is thought that the process starts with the oxyaylation of the alcohol used, a reaction which accompanies alcoholysis of the triglyceride which yields the alkyl radicals to the hydroxyls present in the molecule of said alcohol or else generated in its oxyalkylation, and simultaneous oxyalkylation of the glycerol, mono- and diglycerides which form. Following all these reactions almost all the triglyceride and alcohol allowed to react are transformed.

In any case the novelty of the process claimed and its usefulness are demonstrated independently from any theoretical interpretation of the complex chemical reactions which take place and are detached from them.

Lastly, we would point out the advantage already outlined of being able to prepare by means of this process a practically unlimited range of surfactant products, since it can be carried out equally well with whatever mono- or poly-hydric aliphatic or cyclo-aliphatic alcohol, with whatever fatty acid having from 6 to 30 carbon atoms esterified with whatever aliphatic mono- or poly-hydric alcohol having from 1 to 18 carbon atoms (monoglycerides, diglycerides, triglycerides), with whatever alkylene oxide.

Among the alcohols that, with the process of the present invention, give rise to particularly active products we would indicate: monohydric alcohols with 1–20 carbon atoms; glycols (ethylene glycol, propylene glycol, etc.); glycerol; tetritols (pentaerythrol); pentitols (xylitol, arabitol, etc.); hexitols (sorbitol, mannitol, etc.); higher polyalcohols (sucrose, raffinose, etc.).

Among the glycerides we indicate merely by way of example: natural fats and oils, mono-, di-, tristearin, mono-, di-, tri-palmitin, etc. Among the fatty esters we indicate by way of example: methyl stearate, methyl palmitate, etc.

The preferred alkylene oxides are ethylene and propylene oxide.

As catalysts alkaline substances are used, such as hydroxides or carbonates or alcoholates or salts or organic acid with alkaline metals or tertiary amines in the state of free bases or of salts with carboxylic aliphatic acids, and others, but hydroxides of alkaline metals are preferred.

Alcohol, fatty acid ester and alkylene oxide can be used within wide reciprocal ratios. By suitably varying said ratios it is possible to vary in the way desired the properties of the final products. The preferred catalysts are generally used in proportions of 0.1 to 5% in weight of the total weight of the mixture of hydroxylated compound and fatty acid esters. The preferred proportions are, however, in the range of between 1 and 2%.

We shall now describe in detail the operative methods preferred for the discontinuous process according to the invention, bearing in mind that the process can also be carried out continuously within the scope of the man skilled in the art.

Place in a reactor the fatty acid ester(s), the hydroxylated compound(s), the catalyst and heat to 80–110° C., with stirring. The temperature must be kept around the lower limit of the above range with the thermolabile alcohols, such as sucrose, which tend to become altered by heat, particularly in the presence of strong alkalies as catalysts. The air is removed from the reaction space, if this has not been done beforehand, by flushing with inert gases, then the inert gas is displaced with ethylene oxide and the pressure is brought up to 2–3 atm. of ethylene oxide.

The temperature of the reaction mass is regulated to bring it up to the triggering one which, generally, varies between 100 and 115° C., according in particular, to the nature of the substances allowed to react.

After a more or less length induction period, the reaction starts up and this can be seen from the fall of the pressure and from the tendency of the temperature to rise; let the pressure drop to approx. 1 atm. and then start continuous introduction of the alkylene oxide(s) regulating its flow in order that the pressure inside the reactor is kept as low as possible, eventually also close to that of the atmosphere.

When the temperature reaches approx. 130° C., start to control it, cooling the reaction mass, so that it does not go above 140° C., if thermolabile hydroxylated compounds are present, such as sucrose, or in such a way that it does not go above 190–200° C. with other compounds.

If the hydroxylated compound is not thermolabile, the reaction can be started at 120–130° C. thus reducing the induction time to as little as a few minutes.

When all the alkylene oxide has been introduced, wait until the pressure drops to approx. atmospheric, leave stirring for approx. half an hour, flush with nitrogen, cool the product to a temperature which will permit easy discharge and then discharge.

The yield of the process is, as stated, practically quantitative. As long as the temperature conditions indicated above are respected, it is also possible to carry out the process differently always provided that the substances are placed in reaction simultaneously with the catalysts indicated. Thus it is possible, for example, to start the reaction after having placed in the reactor all the alkylene oxide, or else operate at pressures even considerably higher than 2–3 atm. and even, eventually, operate in the presence of solvents. However, the preferred operative method is the one described above which generally makes it possible to obtain the best yields of surfactant products.

The products obtained with the process according to this invention have properties which are influenced in particular by the length, nature and degree of insaturation of the hydrophobic chains, by the type and quantity of alkylene oxide and by the condition in which the process is carried out.

These products generally have excellent dispersive, wetting, emulsifying and detergent properties, etc. and are generally harmless to human and animal organisms, they do not irritate the skin or the mucosae and, furthermore, those obtained by using ethylene oxide are generally soluble in water and in numerous organic solvents such as acetone, methanol, ethanol, chloroform, carbon tetrachloride, dimethyl formamide, benzol, etc. and are variably soluble in aliphatic and cycloaliphatic hydrocarbon.

In particular, the detergent products obtained with the process of the invention are generally compatible with the normal additives for detergent. Examples of such additives are: alkaline phosphates, alkaline silicates, borates, carbonates, sulfates, chlorides; even sodium carboxy-methyl cellulose can be advantageously used in the detergent compositions in which the active principle is made up of surfactants prepared with the process of this invention. Even other known biodegradable and non-biodegradable surfactants are compatible in mixture with the surfactants produced according to the invention. We give below the surfactant data of some products obtained with the process in one single operation according to the present invention.

the cooling of the autoclave are then regulated so that the temperature of the reaction mass reaches the predetermined value of 135° C.

At the end of the introduction of altogether 200 parts by weight of ethylene oxide, the mixture is stirred for another 30 minutes, then cooled to 50° C. and flushed with nitrogen, discharging a clear liquid oil which is soluble in water and in the usual organic solvents, and presents excellent surfactant properties as indicated in the previous table; refraction index: $n_D^{20} = 1.3680$.

Example 2

Heat 60 parts by weight of tallow, 40 parts by weight of xylitol and 3 parts by weight of 50% aqueous KOH solution to 100° C., stirring vigorously, in a current of nitrogen until the air and water are eliminated.

Then gradually displace the nitrogen with ethylene oxide and when it has been completely displaced, bring up the pressure to 2.5 atm. and at the same time raise the temperature to 115–125° C. Reaction will start up after approx. 15 minutes; start to introduce the ethylene oxide continuously for a period of 3 hours. Altogether introduce 200 parts by weight of ethylene oxide, maintaining the temperature by means of cooling to approx. 140° C. After this period leave the mixture stirring for approx. 30 minutes, cool to 50° C., flush with nitrogen and discharge an oil which is clear, limpid, perfectly soluble in $H_2O$ and in normal organic solvents, with excellent surfactant properties as indicated in the previous table; refractive index: $n_D^{20} = 1.3730$.

TABLE.—SURFACE TENSIONS AT 20° C. OF AQUEOUS SOLUTIONS OF SOME SURFACTANTS OF THE INVENTION

| Corresp. example | Reaction mixture | Parts by weight | Units | G. of surfactant/100 ml. of water | | | |
|---|---|---|---|---|---|---|---|
| | | | | 0.001 | 0.01 | 0.1 | 1 |
| 1 | Glycerol | 40 | dynes/cm | 56.4 | 39.0 | 34.5 | 36.30 |
| | Tallow | 60 | | | | | |
| | Ethylene oxide | 200 | | | | | |
| 2 | Xylitol | 40 | do | 56.0 | 40.3 | 36.0 | 38.3 |
| | Tallow | 60 | | | | | |
| | Ethylene oxide | 200 | | | | | |
| 3 | Sucrose | 40 | do | 46.3 | 41.2 | 34.6 | 39.8 |
| | Tallow | 60 | | | | | |
| | Ethylene oxide | 200 | | | | | |
| 11 | Pentaerythrol | 40 | do | 46.93 | 42.97 | 37.99 | 40.01 |
| | Tallow | 60 | | | | | |
| | Ethylene oxide | 200 | | | | | |
| 12 | Glycerol | 15 | do | 42.48 | 38.18 | 36.21 | 35.56 |
| | Methyl palmitate | 85 | | | | | |
| | Ethylene oxide | 200 | | | | | |
| 13 | Lauryl alcohol | 40 | do | 55.32 | 41.05 | 37.05 | 34.0 |
| | Tallow | 60 | | | | | |
| | Ethylene oxide | 200 | | | | | |

These figures, compared with those known, for example, for pure sucrose distearate or dipalmitate oxyethylates show that the activity of the products obtained with the new process is of the same order as that measured for the pure surfactant compounds prepared in more than one stage, i.e., preparing first the esters of the poly-hydric alcohols and oxyethylating them. Thus it is demonstrated that all or substantially all the components of the product according to the process of the invention are surfactants.

We give below some examples which serve to illustrate the process according to this invention in some of its realizations, without however, determining their limits in any way.

Example 1

A mixture of 60 parts by weight of tallow, 40 parts by weight of glycerol and 3 parts by weight of 50% aqueous KOH solution, is heated in an autoclave at approx. 100° C. in a current of nitrogen until the air has been completely removed. In these conditions the greater part of the water present is also eliminated. The nitrogen is then displaced with small successive introductions of ethylene oxide and enough ethylene oxide is introduced to bring the pressure up to 2 atm., at the same time heating to 125–130° C. After approx. 10 minutes the pressure begins to drop thus indicating that the reaction has begun, which then proceeds more rapidly; the flow of ethylene oxide and Example 3

Introduce into an oxyethylation autoclave 60 parts by weight of tallow, 40 parts by weight of sucrose and 3 parts by weight of 50% aqueous KOH solution, heat with stirring and in a current of nitrogen to 80° C. When all the air and water have been eliminated, displace the nitrogen with ethylene oxide and bring the pressure up to 3 atm. heating at the same time to 110–120° C. The pressure will drop after approx. 30 minutes whilst the temperature will rise spontaneously to 130° C. Start to introduce ethylene oxide continuously for 2 to 3 hours. Altogether introduce 200 parts by weight of ethylene oxide, controlling the temperature so that it does not rise above 140° C. Continue stirring for another 30 minutes, cool to approx. 50° C. and flush with nitrogen and then discharge an oil which is thick, brown, completely soluble in water and in normal organic solvents, with excellent surfactant properties as indicated in the previous table.

On analysis, this product does not show the presence of significant quantities of starting products, i.e. triglycerides and sucrose, which in practice have all been substantially transformed.

Example 4

React 90 parts by weight of tallow, 10 parts by weight of sucrose, and 3 parts by weight of 50% aqueous KOH solution with 200 parts by weight of ethylene oxide under exactly the same conditions as described in the previous example. Also in this case an oil is obtained which is soluble in water and in most organic solvents, and which has marked surfactant properties.

Example 5

Following the methods described in Example 3, react 18 parts by weight of sucrose, 82 parts by weight of tallow and 200 parts by weight of ethylene oxide in the presence of 3 parts by weight of 50% aqueous KOH solution. The final product is a homogeneous, fluid oil, colored yellow to brown, free of unaltered triglyceride. The yield is quantitative.

The product can be further decolorized by means of the addition of hydrogen peroxide (approx. 1% by weight) prior to cooling. It dissolves rapidly in water and in many organic solvents.

Example 6

Operate in a similar way to Example 3, varying the tallow/sucrose ratio which in this example is 70:30, and catalyzing with 7.25 g. of potassium palmitate. The total mixture is thus absolutely anhydrous.

The resulting product is oily, homogeneous and viscous, soluble in water and in normal organic solvents. The product does not contain appreciable quantities of non-reacted triglyceride and sucrose and has excellent surfactant properties.

Example 7

Operate as in Example 3, reacting 50 parts by weight of sucrose, 50 parts by weight of tallow and 200 parts by weight of ethylene oxide.

The resulting product is a very thick oil, soluble in water and in a good number of organic solvents, and with excellent surfactant properties.

Example 8

Introduce into an autoclave 90 parts by weight of a commercial mixture of monoglycerides and diglycerides from tallow with a content in mono-, di- and triglycerides respectively of about 60%, 30% and 10%; thereafter introduce 10 parts by weight of sucrose and 3 parts by weight of an aqueous KOH solution. Heat the mixture with stirring and in a current of nitrogen to approx. 90° C., until all the water and air have been eliminated. Then replace the nitrogen with ethylene oxide and bring the pressure up with the latter to 3 atm. heating at the same time to 100–110° C. After approx. 30 minutes the reaction starts up, as indicated by the reduction of the pressure and the rise in the temperature; begin to introduce ethylene oxide continuously for 3 hours approx., introducing altogether the 200 parts by weight which it is wished to react.

The temperature during the introduction of ethylene oxide is kept at 130° C.

At the end of the reaction, stir for a further 30 minutes approx. until the pressure drops to zero. Cool, flush with nitrogen and discharge at approx. 50° C. with practically quantitative yield, a product which is thick, fluid and limpid, soluble in water and in most organic solvents.

Example 9

With the same operative method described in the previous example, react 80 parts by weight of a commercial mixture of tallow, mono-, di- and triglycerides, as specified in Example 8, 20 parts by weight of sucrose, 200 parts by weight of ethylene oxide and 2 parts by weight of 50% aqueous KOH solution. The resulting product is oily, thicker than the previous product, with similar solubility and surfactant properties.

Example 10

Introduce into an autoclave 78 parts by weight of tallow, 22 parts by weight of glycerol and 3 parts by weight of 50% aqueous KOH solution; heat the mixture to 100° C. When all the air has been eliminated, displace the nitrogen with ethylene oxide, bring up the pressure to 2.5 atm. and heat to 110–115° C. until the reaction starts up.

At this point, start the continuous flow of ethylene oxide and control the temperature by cooling so that it does not rise above 160° C. At the end of 3 hours, a total of 200 parts by weight of ethylene oxide should have been introduced. Continue stirring and heating until the pressure drops to 0, cool to approx. 50° C., flush with nitrogen and discharge a homogeneous, transparent liquid, soluble in water and in most organic solvents, with excellent surfactant properties.

Example 11

Place in an autoclave 60 parts by weight of tallow, 40 parts by weight of pentaerythritol and 3 parts by weight of 50% aqueous KOH solution. Heat the mixture to 80° C. with stirring in a current of nitrogen until all the air has been eliminated.

Then displace the nitrogen with small quantities of ethylene oxide and bring up the pressure again with ethylene oxide to 3 atm, heating at the same time to 110–120° C. When the reaction has started up, begin to introduce ethylene oxide continuously so that the introduction of 200 parts by weight of this compound is completed in the course of three hours. The temperature is controlled by means of cooling so that it does not rise above 130–140° C.

When the introduction of the ethylene oxide has been completed, continue stirring and heating until the pressure drops to about the atmospheric, cool to approx. 50° C. and discharge. The resulting product is soluble in water and in organic solvent and has excellent surfactant properties, as indicated in the previous table: $n_D^{20}=1.375$.

Example 12

Introduce into an autoclave 85 parts by weight of methyl palmitate, 15 parts by weight of glycerol and 3 parts by weight of 50% aqueous KOH solution. Heat the mixture whilst stirring vigorously in a current of nitrogen to 110–115° C. When the water and air have been eliminated, displace the nitrogen with ethylene oxide and bring up the pressure within the latter to 2.5 atm. After approx. 10 minutes begin to introduce ethylene oxide continuously in such a way as to complete the introduction of the 200 parts by weight in approx. 2 hours. The temperature is checked by cooling so that it does not rise above 150° C. At the end the reaction mixture is cooled, flushed with nitrogen and discharged. The resulting product is a thick oil, dispersible in water, with excellent surfactant properties as indicated in the previous table.

Example 13

Following the same technique described in the previous example, react in an autoclave 40 parts by weight of lauryl alcohol, 60 parts by weight of tallow and 3 parts by weight of 50% aqueous KOH solution with 200 parts by weight of ethylene oxide. The temperature for starting up the reaction is 110–115° C. and the operating temperature 150–160° C. The absorption of ethylene oxide proceeds rapidly and the reaction is completed in 1–2 hours. The final product discharged at 50–60° C. is a thick, homogeneous liquid, slightly yellow in color.

At room temperature the product changes into a waxy mass, dispersible in water and soluble in many organic solvents, with excellent surfactant properties as indicated in the previous table.

Example 14

Operating as described in Example 3, react 21 parts by weight of sucrose and 79 parts by weight of coconut-oil with 200 parts by weight of ethylene oxide, in the presence of 1.5 parts by weight of 50% aqueous KOH solution as catalyst.

The final product obtained with quantitative yields compared with the weight of the reaction agents, does not contain appreciable quantities of non-reacted sugar and fats; it is a clear brown oil, very soluble in water and in many organic solvents.

Example 15

In an autocalve introduce 60 parts by weight of tallow, 40 parts by weight of sorbitol and 3 parts by weight of a 50% potassium hydroxide solution as catalyst. The mixture heated to 110–115° C. is treated with 200 parts by weight of ethylene oxide, added gradually. Suitably regulate the flow of ethylene oxide and the cooling system in such a way that the reaction proceeds at a temperature of not more than 140° C.

Thus operating the addition of ethylene oxide is completed within 2 hours.

The final product, obtained with quantitative yields, is a pale yellow liquid, which is fluid, transparent and soluble in water and in many organic solvents.

Example 16

In an autoclave introduce 60 parts by weight of tallow, 40 parts by weight of (alpha)-methyl-D(+)-glucoside and 3 parts by weight of 50% aqueous potassium hydroxide solution. In this mixture, heated to 100–110° C., introduced 200 parts by weight of ethylene oxide. The absorption of the ethylene oxide takes place quickly and the reaction is completed in 90 minutes, without the temperature ever rising above 130° C.

The product obtained is a fluid, clear, transparent oil, perfectly soluble in water and in many organic solvents.

Example 17

Place in an autoclave 80 parts by weight of tallow, 20 parts by weight of ethylene glycol and 3 parts by weight of a 50% aqueous potassium hydroxide solution. Heat the mixture to 115–120° C. and add 200 parts by weight of ethylene oxide. The addition should be carried out rapidly controlling the cooling so that the temperature does not rise above 150° C.

The operation is completed in 60–90 minutes.

The resulting product is a fluid, limpid and clear oil, perfectly soluble in water and in many organic solvents.

Example 18

Place in an autoclave 80 parts by weight of tallow, 20 parts by weight of sucrose and 3 parts by weight of a 50% aqueous potassium hydroxide solution.

Add to the mixture heated to 90–110° C., 100 parts by weight of ethylene oxide. The ethylene oxide is added in the course of 90 minutes maintaining the temperature at 130–135° C.

At the end, a thick brown oil is obtained, soluble in water and in many organic solvents.

Example 19

In an oxyethylation autoclave place 70 parts by weight of tallow, 30 parts by weight of sucrose and 3 parts by weight of a 50% aqueous potassium hydroxide solution.

Heat the mixture to 110–115° C. and add over a period of 3–4 hours 300 parts by weight of ethylene oxide, ensuring that the temperature does not rise above 140° C.

The final product is a very viscous oil which when cooled takes on the consistency of a semisolid paste; it dissolves in water and in many organic solvents.

Variations can of course be made without departing from the spirit of the invention.

Having thus described the invention, what is desired to be secured and claimed by Letters Patent is:

We claim:

1. Process for the preparation of surfactant substances which comprises simultaneously reacting (1) at least one hydroxylated organic compound selected from the group consisting of mono-hydric alcohols, glycols, tri-hydric alcohols, tetra-hydric alcohols, pentitols, hexitols, disaccharides, trisaccharides, (2) at least one fatty acid ester selected from the group consisting of methyl- and glycerin-esters of fatty acids having from 10 to 20 carbon atoms, and (3) at least one alkylene oxide having from 2 to 4 carbon atoms, in the presence of an alkaline catalyst at a temperature of between 70 and 200° C. and at a pressure of between 1 and 50 atmopheres, the amount of the hydroxylated compound being between 10 and 50 parts by weight, that of the fatty acid ester between 50 and 90 parts by weight and that of the alkylene oxide between 100 and 300 parts by weight.

2. Process according to claim 1, wherein the catalyst is an alkaline metal hydroxide, carbonate, or alcoholate, an organic acid salt of an alkaline metal, a free tertiary amine or a tertiary amine salt of an aliphatic carboxylic acid.

3. Process as defined by claim 1, wherein the hydroxylated organic compound is lauryl alcohol.

4. Process as defined by claim 1, wherein the hydroxylated organic compound is ethylene glycol.

5. Process as defined by claim 1, wherein the hydroxylated organic compound is glycerol.

6. Process as defined by claim 1, wherein the hydroxylated organic compound is pentaerythritol.

7. Process as defined by claim 1, wherein the hydroxylated organic compound is xylitol.

8. Process as defined by claim 1, wherein the hydroxylated organic compound is sorbitol.

9. Process as defined in claim 1, wherein the hydroxylated organic compound is methyl glucoside.

10. Process as defined in claim 1, wherein the hydroxylated organic compound is sucrose.

11. Process as defined by claim 1, wherein the alkylene oxide is ethylene oxide.

12. Process as defined by claim 2, wherein the catalyst is an alkaline metal hydroxide in the ratio of 0.1–5% by weight based on the weight of the mixture of hydroxylated compound and fatty acid ester.

13. Process as defined by claim 2, wherein the catalyst is the palmitate of an alkaline metal in the ratio of 1–10% by weight based on the weight of the mixture of hydroxylated compound and fatty acid ester.

14. Process as defined in claim 1, wherein the reaction is carried out in the absence of solvents.

15. A surfactant product obtained from lauryl alcohol tallow and ethylene oxide, according to the process as defined by claim 1.

16. A surfactant product obtained from ethylene glycols, tallow and ethylene oxide according to the process as defined by claim 1.

17. A surfactant product obtained from glycerol, tallow and ethylene oxide according to the process as defined by claim 1.

18. A surfactant product obtained from glycerol, methyl palmitate and ethylene oxide according to the process as defined by claim 1.

19. A surfactant product obtained from pentaerythritol, tallow and ethylene oxide according to the process as defined by claim 1.

20. A surfactant product obtained from xylitol, tallow and ethylene oxide according to the process as defined by claim 1.

21. A surfactant product obtained from sorbitol, tallow and ethylene oxide according to the process as defined by claim 1.

22. A surfactant product obtained from methylglucoside, tallow and ethylene oxide according to the process as defined by claim 1.

23. A surfactant product obtained from sucrose, tallow and ethylene oxide according to the process as defined by claim 1.

24. A surfactant product obtained from sucrose, coconut-oil, and ethylene oxide according to the process as defined by claim 1.

25. A surfactant product obtained from sucrose, a mixture of mono- and diglycerides and triglycerides, and ethylene oxide according to the process as defined by claim 1.

References Cited

UNITED STATES PATENTS 2,678,935  5/1954  Sundberg _____ 260—410.6

LORRAINE A. WEINBERGER, *Primary Examiner.*

JAMES H. NIELSEN, *Assistant Examiner.*

U.S. Cl. X.R.

260—234, 410.6, 410.7